R. ROOT.
Surveying Instrument.
No. 26,621.
Patented Dec. 27, 1859.
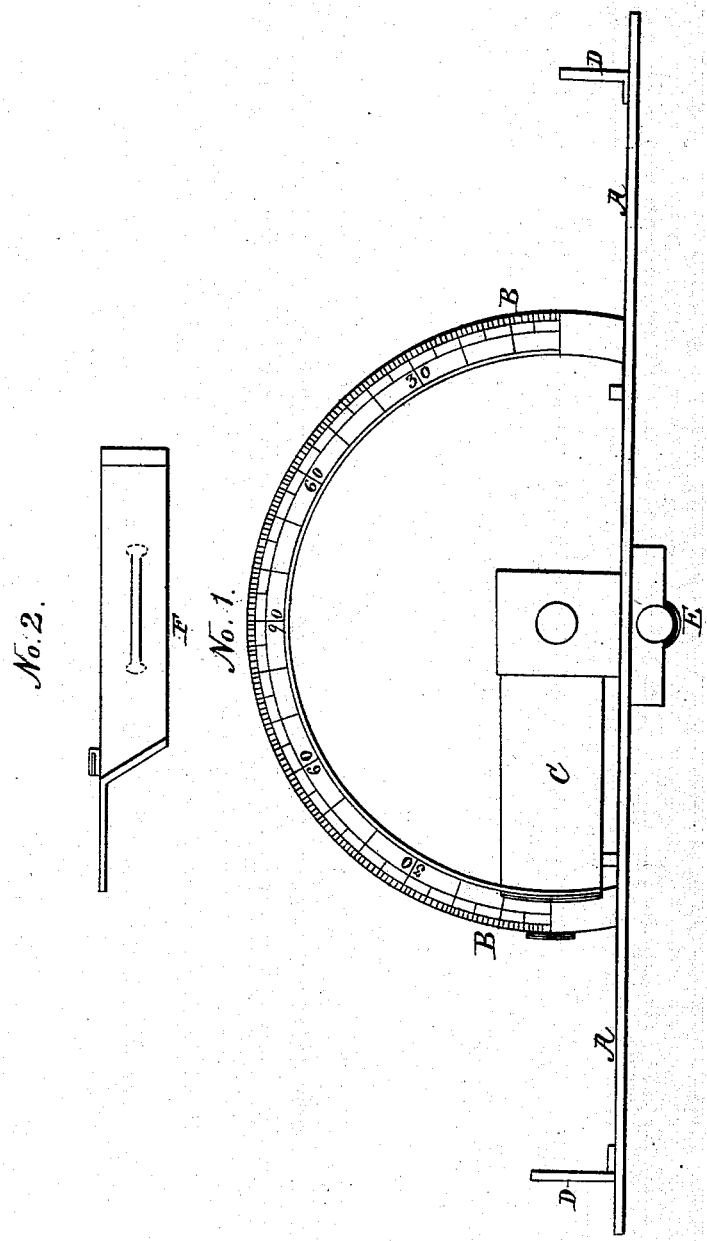
Witnesses.
L H Fuller
S F Strath
Inventor.
Riley Root,

UNITED STATES PATENT OFFICE.

RILEY ROOT, OF GALESBURG, ILLINOIS.

SURVEYING INSTRUMENT.

Specification of Letters Patent No. 26,621, dated December 27, 1859.

*To all whom it may concern:*

Be it known that I, RILEY ROOT, of Galesburg, in the county of Knox and State of Illinois, have invented a new and useful instrument, called a "diamadrant," designed for civil engineering and taking astronomical observations; and I do hereby declare that the following is a full, clear, and exact description of the construction and operation of the same, reference being had to the annexed drawings, making a part of this specification, in which—

Figure 1, is a side view of the instrument, Fig. 2, is a vertical view of the double spirit level.

Reference letter A, represents the plate to which are attached a graduated half circle, the double spirit level, the sights, or telescope, as the case may be, and the axle, around which the plate revolves. B, a graduated circle; C, a double spirit level; D, the sights; E, the axle, F, the double spirit level as seen in Fig. 2.

Respecting the dimensions of the instrument no definite size need be named. The plate may be from 10 to 14 inches in length, and the circle from 6 to 10 inches in diameter, as suits the pleasure of the occupant.

The instrument is designed as an attachment to a surveyor's compass, and can be placed over it, or at the side of it, as seen by the drawing, but its legitimate use cannot be well understood except it be placed at the side of a compass. In this case, the axle is made with a broad end, so as to be screwed solid to the plate of a compass. The instrument can then be turned upon its axis from a horizontal position to a perpendicular one, so that angles of all elevations may be taken with it.

The double spirit level serves two purposes. It is not only used as a level, but as an index, to point to the degree of elevation. The level or index is made to move over the whole of the graduated scale, so that in using the instrument, the level must always be placed on the lowest end of the graduated half circle, except when a level line is to be taken, and in that case it makes no difference. Therefore to obtain the latitude of a place, it is necessary only, to set the instrument and direct the sights to the north star at the proper time of observation, and elevate the spirit level to a horizontal position, and the degree on which the index rests, is the latitude of the place.

For the survey of a railroad, the field notes are best arranged as follows,

| From station— | Course and distance. | Grades. | Remarks. |
|---|---|---|---|
| 1 to 2 | North 20 deg. E. 10 chs | 3 deg. plus | |
| 2 to 3 | North 25 deg. E. 10 chs | 4 deg. minus | |
| 3 to 4 | North 20 deg, E. 10 chs | Zero or level | |

Elevations or depressions in railroad surveys, need not be taken in feet with this instrument, as is usual with a transit, although that method may be pursued if desired.

Having now described the instrument and the mode of using it, I do not claim either a horizontal or vertical graduated circle for the purpose of determining the degrees of radiated lines, nor the use of a single spirit level, but—

What I do claim as my invention, and desire to secure by Letters Patent, is—

The arrangement of a revolving double spirit level adapted to a graduatd circle as seen in the drawing and set forth in the specifications for astronomical and engineering purposes.

RILEY ROOT.

Witnesses:
L. H. FULLER,
S. F. STEELE.